US011520912B2

(12) United States Patent
Chen et al.

(10) Patent No.: US 11,520,912 B2
(45) Date of Patent: Dec. 6, 2022

(54) METHODS, MEDIA, APPARATUSES AND COMPUTING DEVICES OF USER DATA AUTHORIZATION BASED ON BLOCKCHAIN

(71) Applicant: NETEASE (HANGZHOU) NETWORK CO., LTD., Hangzhou (CN)

(72) Inventors: Gang Chen, Hangzhou (CN); Shanghu Luo, Hangzhou (CN); Yi Guo, Hangzhou (CN); Yongxiang Zhang, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 317 days.

(21) Appl. No.: 17/044,250

(22) PCT Filed: Nov. 23, 2018

(86) PCT No.: PCT/CN2018/117208
§ 371 (c)(1),
(2) Date: Sep. 30, 2020

(87) PCT Pub. No.: WO2019/214211
PCT Pub. Date: Nov. 14, 2019

(65) Prior Publication Data
US 2021/0157938 A1    May 27, 2021

(30) Foreign Application Priority Data
May 10, 2018    (CN) .......................... 201810445435.5

(51) Int. Cl.
*G04F 7/04*        (2006.01)
*G06F 21/62*       (2013.01)
(Continued)

(52) U.S. Cl.
CPC ............ *G06F 21/62* (2013.01); *H04L 9/3236* (2013.01); *H04L 63/0428* (2013.01); *H04L 63/123* (2013.01); *H04L 9/50* (2022.05)

(58) Field of Classification Search
CPC ........ H04L 9/3236; H04L 63/123; H04L 9/50
(Continued)

(56) References Cited

U.S. PATENT DOCUMENTS 9,992,022 B1 *   6/2018   Chapman .............. H04L 9/3236
10,367,796 B2 *  7/2019   Blake .................... H04L 9/3236
(Continued)

FOREIGN PATENT DOCUMENTS

| CN | 106686008 A | 5/2017 |
| CN | 107241360 A | 10/2017 |

(Continued)

OTHER PUBLICATIONS

Office Action issued in corresponding CN Application No. 201810445435.5 with English translation dated Nov. 19, 2019 (15 pages).
(Continued)

*Primary Examiner* — Amare F Tabor
(74) *Attorney, Agent, or Firm* — Osha Bergman Watanabe & Burton LLP

(57) ABSTRACT

A method of user data authorization based on blockchain includes: storing, by a first application client, encrypted user data of user data in a blockchain database through a blockchain node, generating authorization information in response to a request of acquiring the user data by a second application client, and notifying the second application client to obtain the authorization information such that the second application client obtains the user data based on the encrypted user data and the authorization information. The encrypted user data is stored in the blockchain database such
(Continued)

that the encrypted user data cannot be tampered with and a leak of real user data is prevented. The second application client obtains the user data based on the authorization information and the encrypted user data.

17 Claims, 5 Drawing Sheets

(51) Int. Cl.
*H04L 9/32* (2006.01)
*H04L 9/40* (2022.01)
*H04L 9/00* (2022.01)

(58) Field of Classification Search
USPC .......................................................... 726/26
See application file for complete search history.

(56) References Cited

U.S. PATENT DOCUMENTS

| | | | | |
|---|---|---|---|---|
| 10,671,733 | B2* | 6/2020 | Baker | H04L 63/306 |
| 10,686,611 | B2* | 6/2020 | Ramos | H04L 9/0637 |
| 10,819,684 | B2* | 10/2020 | Ramos | G06F 21/6245 |
| 11,212,081 | B2* | 12/2021 | Karame | G06Q 20/3678 |
| 2017/0046638 | A1 | 2/2017 | Chan et al. | |
| 2019/0156336 | A1* | 5/2019 | Kasthuri | G06Q 20/065 |
| 2021/0279722 | A1* | 9/2021 | Magerkurth | H04L 9/0861 |

FOREIGN PATENT DOCUMENTS

| | | |
|---|---|---|
| CN | 107483446 A | 12/2017 |
| CN | 107979590 A | 5/2018 |
| CN | 108632284 A | 10/2018 |
| WO | 2017107976 A1 | 6/2017 |

OTHER PUBLICATIONS

Office Action issued in corresponding CN Application No. 201810445435.5 with English translation dated Apr. 15, 2020 (15 pages).

International Search Report issued in International Application No. PCT/CN2018/117208 dated Jan. 23, 2019 (2 pages).

Written Opinion issued in International Application No. PCT/CN2018/117208 dated Jan. 23, 2019 (4 pages).

* cited by examiner

METHODS, MEDIA, APPARATUSES AND COMPUTING DEVICES OF USER DATA AUTHORIZATION BASED ON BLOCKCHAIN

TECHNICAL FIELD

Embodiments of the invention relate to the technical field of Internet technology. More particularly, embodiments of the invention relate to methods, media, apparatuses and computing devices for user data authorization based on blockchain.

BACKGROUND OF THE INVENTION

This section is intended to provide a background or context to embodiments of the invention that are set forth in the claims. Though provided, no description in this section is an admission as prior art.

The development of Internet technology has driven the prosperity and rapid rise of applications. Various applications can enable users to achieve different functionalities and address different needs.

Although the development of applications is rather rapid, the landscape is not changed as different applications are isolated from each other. For instance, data generated from an application cannot be shared with other applications. Behavior data or information data generated by an interaction of a user with an application is limited to the scope of use of the application and is not able to be shared with other applications or correlated with behavior data or information data generated by the user in other applications. It has been a problem to share user data between different applications on the premise of user data security.

SUMMARY OF THE INVENTION

For reasons such as user data security cannot be ensured, sharing of user data between different applications cannot be achieved in prior art.

In the prior art, therefore, it is inconvenient to share user data between different applications on the premise of user data security.

A need therefore exists for a method of user data authorization based on blockchain to achieve a sharing of user data between different applications on the premise of user data security.

In the disclosure, embodiments of the invention provide a method and device of user data authorization based on blockchain.

The first aspect of embodiments of the invention provides a method of user data authorization based on blockchain. The method can be performed at a first application client. The method can comprise sending encrypted user data of user data to blockchain nodes, such that each of the blockchain nodes stores the encrypted user data in a corresponding blockchain database; generating authorization information in response to a request of acquiring the user data by a second application client; and notifying the second application client to obtain the authorization information based on a preset rule, such that the second application client obtains the encrypted user data from a blockchain database corresponding to a blockchain node based on the authorization information and obtains the user data based on the encrypted user data and the authorization information.

In an embodiment of the invention, the encrypted user data of the user data can comprise encrypted user data obtained by encrypting the user data using an encryption key. In some instances, generating authorization information can comprise generating the authorization information based on a decryption key corresponding to the encryption key and identification information of the encrypted user data. In some instances, the second application client obtaining the encrypted user data from a blockchain database corresponding to a blockchain node based on the authorization information and obtaining the user data based on the encrypted user data and the authorization information can comprise, after obtaining the authorization information, the second application client obtaining the encrypted user data from a blockchain database corresponding to a blockchain node based on the identification information of the encrypted user data in the authorization information and obtaining the user data by decrypting the encrypted user data using the decryption key in the authorization information.

In another embodiment of the invention, the encrypted user data of the user data can comprise encrypted user data obtained by encrypting a hash value of the user data using the encryption key. In some instances, generating authorization information can comprise generating the authorization information based on a decryption key corresponding to the encryption key and identification information of the encrypted user data. In some instances, the second application client obtaining the encrypted user data from a blockchain database corresponding to a blockchain node based on the authorization information and obtaining the user based on the encrypted user data and the authorization information can comprise, after obtaining the authorization information, the second application client obtaining the encrypted user data from a blockchain database corresponding to a blockchain node based on the identification information of the encrypted user data in the authorization information, decrypting the encrypted user data using the decryption key in the authorization information to obtain a hash value of the user data, and confirming a receipt of the user data by verifying the received user data using the hash value.

In still another embodiment of the invention, the method can further comprise, after generating the authorization information, sending the authorization information and the identification information of the second application client to the blockchain nodes, such that each of the blockchain nodes stores the authorization information in a corresponding blockchain database based on the identification information of the second application client. In some instances, notifying the second application client to obtain the authorization information based on a preset rule can comprise notifying the second application client to obtain the authorization information from a blockchain database corresponding to a blockchain node based on the identification information of the second application client.

In still another embodiment of the invention, identification information of the second application client and a public key of the second application client can be stored in association with each other in a blockchain database corresponding to a blockchain node. In some instances, the method can further comprise obtaining identification information of the second application client and obtaining the public key of the second application client from a block corresponding to a blockchain node based on the identification information of the second application client. In some instances, generating the authorization information based on a decryption key corresponding to the encryption key and identification information of the encrypted user data can comprise generating the authorization information by encrypting the decryption key and the identification information of the encrypted user data using the public key of the second application client. In some instances, once obtaining the authorization information, the second application client can decrypt the authorization information using the private key of the second application client to obtain the decryption key and the identification information of the encrypted user data.

In still another embodiment of the invention, generating the authorization information in response to a request for acquiring the user data by the second application client can comprise determining whether the second application client has a permission of acquisition, and generating the authorization information if the second application client has the permission of acquisition.

In still another embodiment of the invention, determining whether the second application client has a permission of acquisition can comprises displaying an authorization query dialog box; if a positive input is received for the authorization query, determining the second application client has the permission of acquisition; and if a negative input is received for an authorization query, determining the second application client does not have the permission of acquisition.

In still another embodiment of the invention, the encryption key can comprise an encryption key that changes based on a preset change rule.

In still another embodiment of the invention, the method can further comprise receiving identification information of the encrypted user data which is returned from the blockchain node after the blockchain node storing the encrypted user data in the blockchain database.

The second aspect of embodiments of the invention provides a method of user data authorization based on blockchain. The method can be performed at a second application client. The method can comprise sending a request for acquiring user data to a first application client; obtaining authorization information based on a preset rule; obtaining encrypted user data corresponding to the user data from a blockchain database corresponding to a blockchain node based on the authorization information; and obtaining the user data based on the encrypted user data and the authorization information.

In an embodiment of the invention, the encrypted user data of the user data can comprise encrypted user data obtained by encrypting the user data by using an encryption key. In some instances, the authorization information can be generated based on a decryption key corresponding to the encryption key and identification information of the encrypted user data. In some instances, obtaining encrypted user data corresponding to the user data from a blockchain database corresponding to a blockchain node based on the authorization information can comprise obtaining the encrypted user data from a blockchain database corresponding to a blockchain node based on the identification information of the encrypted user data in the identification information. In some instances, obtaining the user data based on the encrypted user data and the authorization information can comprise decrypting the encrypted user data using the decryption key in the authorization information to obtain the user data.

In another embodiment of the invention, the encrypted user data of the user data can comprise encrypted user data obtained by encrypting a hash value of the user data using the encryption key. In some instances, the authorization information can be generated based on the decryption key corresponding to the encryption key and identification information of the encrypted user data. In some instances, obtaining the encrypted user data corresponding to the user data from a blockchain database corresponding to a blockchain node based on the authorization information can comprise obtaining the encrypted user data from a blockchain database corresponding to a blockchain node based on the identification information of the encrypted user data in the authorization information. In some instances, obtaining the user data based on the encrypted user data and the authorization information can comprise decrypting the encrypted user data using the decryption key in the authorization information to obtain a hash value of the user data and confirming a receipt of the user data by verifying the received user data using the hash value.

In another embodiment of the invention, identification information of the second application client and the authorization information can be stored in association with each other in a blockchain database corresponding to a blockchain node. In some instances, obtaining the authorization information based on a preset rule can comprise obtaining the authorization information from a blockchain database corresponding to a blockchain node based on the identification information of the second application client.

In still another embodiment of the invention, the method can further comprise sending the identification information of the second application client and the public key of the second application client to the blockchain nodes or sending the identification information of the second application client and the public key of the second application client to the blockchain nodes through a second application server, such that each of the blockchain nodes stores the public key of the second application client to a corresponding blockchain database based on the identification information of the second application client. In some instances, the authorization information can be generated by encrypting the decryption key and the identification information of the encrypted user data using the public key of the second application client. In some instances, obtaining the encrypted user data corresponding to the user data from a blockchain database corresponding to a blockchain node based on the authorization information and obtaining the user data based on the encrypted user data and the authorization information can comprise decrypting the authorization information using the private key of the second application client to obtain the decryption key and identification information of the encrypted user data.

The third aspect of embodiments of the invention provides an apparatus of user data authorization based on blockchain. The apparatus can be used with a first application client. The apparatus can comprise user data management module configured to send encrypted user data of user data to blockchain nodes, such that each of the blockchain nodes stores the encrypt the data in a corresponding blockchain database, and an authorization module configured to generate authorization information in response to a request for acquiring the user data from the second application client, and notify the second application client to obtain the authorization information based on a preset rule, such that the second application client obtains the encrypted user data from a blockchain database corresponding to a blockchain node based on the authorization information and obtains the user data based on the encrypted user data and the authorization information.

In an embodiment of the invention, the encrypted user data of the user data can comprise encrypted user data obtained by encrypting the user data using an encryption key. In some instances, the authorization module can be configured to generate the authorization information based on a decryption key corresponding to the encryption key and identification information of the encrypted user data, such that once obtaining the authorization information, the second application client obtains the encrypted user data from a blockchain database corresponding to a blockchain node based on the identification information of the encrypted user data and obtains the user data by decrypting the encrypted user data using the decryption key.

In another embodiment of the invention, the encrypted user data of the user data can comprise encrypted user data obtained by encrypting a hash value of the user data using the encryption key. In some instances, the authorization module can be configured to generate the authorization information based on a decryption key corresponding to the encryption key and the identification information of the encrypted user data, such that once obtaining the authorization information, the second application client obtains the encrypted user data from a blockchain database corresponding to a blockchain node based on the identification information of the encrypted user data, obtains a hash value of the user data by decrypting the encrypted user data using the decryption key, and confirms a receipt of the user data by verifying the received user data using the hash value.

In yet another embodiment of the invention, the authorization module can be further configured to send the identification information of the second application client and the authorization information to blockchain nodes after generating the authorization information, such that each of the blockchain nodes stores the authorization information in a corresponding blockchain database based on the identification information of the second application client. In some instances, the authorization module can be configured to notify the second application client, such that the second application client obtains the authorization information from a blockchain database corresponding to a blockchain node based on the identification information of the second application client.

In still another embodiment of the invention, the identification information of the second application client and a public key of the second application client can be stored in association with each other in a blockchain database corresponding to a blockchain node. In some instances, the authorization module can be further configured to obtain the identification information of the second application client and obtain the public key of the second application client from a blockchain database corresponding to a blockchain node based on the identification information of the second application client. In some instances, the authorization module can be configured to obtain the authorization information by encrypting the decryption key and the identification information of the encrypted user data using the public key of the second application client. In some instances, once obtaining the authorization information, the second application client can decrypt the authorization information using the private key of the second application client to obtain the decryption key and the identification information of the encrypted user data.

In still another embodiment of the invention, the authorization module can be further configured to determine whether the second application client has a permission of acquisition in response to the request of acquiring the user data by the second application client and generate the authorization information if the second application client has a permission of acquisition.

In still another embodiment of the invention, the authorization module can be configured to display an authorization query dialog box. If a positive input for the authorization query is received, the authorization module can determine that the second application client has the permission of acquisition. If a negative input for the authorization query is received, the authorization module can determine that the second application client does not have the permission of acquisition.

In still another embodiment of the invention, the encryption key can comprise an encryption key that changes based on a preset change rule.

In still another embodiment of the invention, the user data management module can be further configured to receive identification information of the encrypted user data which is returned by the blockchain node after the blockchain node storing the encrypted user data in the blockchain database.

The fourth aspect of embodiments of the invention provides an apparatus of user data authorization based on blockchain. The apparatus can be used with a second application client. The apparatus can comprise a request module configured to send a request for acquiring user data to a first application client and an acquisition module configured to obtain authorization information based on a preset rule, obtain encrypted user data corresponding to the user data from a blockchain database corresponding to a blockchain node based on the authorization information, and obtain the user data based on the encrypted user data and the authorization information.

In an embodiment of the invention, the encrypted user data of the user data can comprise encrypted user data obtained by encrypting the user data using an encryption key. In some instances, the authorization information can be generated based on a decryption key corresponding to the encryption key and identification information of the encrypted user data. In some instances, the acquisition module can be configured to obtain the encrypted user data from a blockchain database corresponding to a blockchain node based on the identification information of the encrypted user data and obtain the user data by decrypting the encrypted user data using the decryption key.

In another embodiment of the invention, the encrypted user data of the user data can comprise encrypted user data obtained by encrypting a hash value of the user data using the encryption key. In some instances, the authorization information can be generated based on a decryption key corresponding to the encryption key and the identification information of the encrypted user data. In some instances, the acquisition module can be configured to obtain the encrypted user data from a blockchain database corresponding to a blockchain node based on the identification information of the encrypted user data, obtain a hash value of the user data by decrypting the encrypted user data using the decryption key, and confirm a receipt of the user data by verifying the received user data using the hash value.

In another embodiment of the invention, the identification information of the second application client and the authorization information can be stored in association with each other in a blockchain database corresponding to a blockchain node. In some instances, the acquisition module can be configured to obtain the authorization information from a blockchain database corresponding to a blockchain node based on the identification information of the second application client.

In still another embodiment of the invention, the above device can further comprise an information management module. In some instances, the information management module can be configured to send the identification information of the second application client and the public key of the second application client to the blockchain nodes, or the information management module is configured to send the identification information of the second application client and the public key of the second application client to the blockchain nodes through a second application server, such that each of the blockchain nodes stores the public key of the second application client to a corresponding blockchain database based on the identification information of the second application client. In some instances, the authorization information can be generated by encrypting the decryption key and the identification information of the encrypted user data using the public key of the second application client. In some instances, the acquisition module can be configured to decrypt the authorization information using the private key of the second application client to obtain the decryption key and identification information of the encrypted user data.

The fifth aspect of embodiments of the invention provides medium storing computer-executable instructions. When executed by a processor, the computer-executable instructions can implement a method of user data authorization based on blockchain of any one of the aspects discussed hereinabove.

The sixth aspect of embodiments of the invention provides computing device comprising a memory, a processor, and executable instructions stored on the memory and executable by the processor. When executed by the processor, the executable instructions implement a method of user data authorization based on blockchain of any one of the aspects discussed hereinabove.

With the method and apparatus of user data authorization based on blockchain disclosed in embodiments of the present invention, the blockchain database can prevent date tampering, such that the encrypted user data stored in the blockchain database cannot be tampered with. In addition, a leak of corresponding real user data can be prevented by using the encrypted user data. When the second application client acquires the user data, the first application client can generate authorization information corresponding to the request of the second application client, such that the second application client can obtain the user data based on the authorization information and the encrypted user data stored in the blockchain database. Therefore, a secure and effective user data authorization mechanism is provided to realize sharing of user data between different applications, realizing an interconnection and interoperability between different applications under the premise of date security.

BRIEF DESCRIPTION OF THE DRAWINGS

The above and other objects, features and advantages of exemplary embodiments of the invention will be readily understood by reading the following detailed description with reference to the accompanying drawings. Various embodiments of the invention are illustrated by way of example without limitation in the accompanying drawings of which.

In the drawings, same or corresponding reference numerals represent the same or corresponding elements.

DETAILED DESCRIPTION OF THE INVENTION

Figure 1:
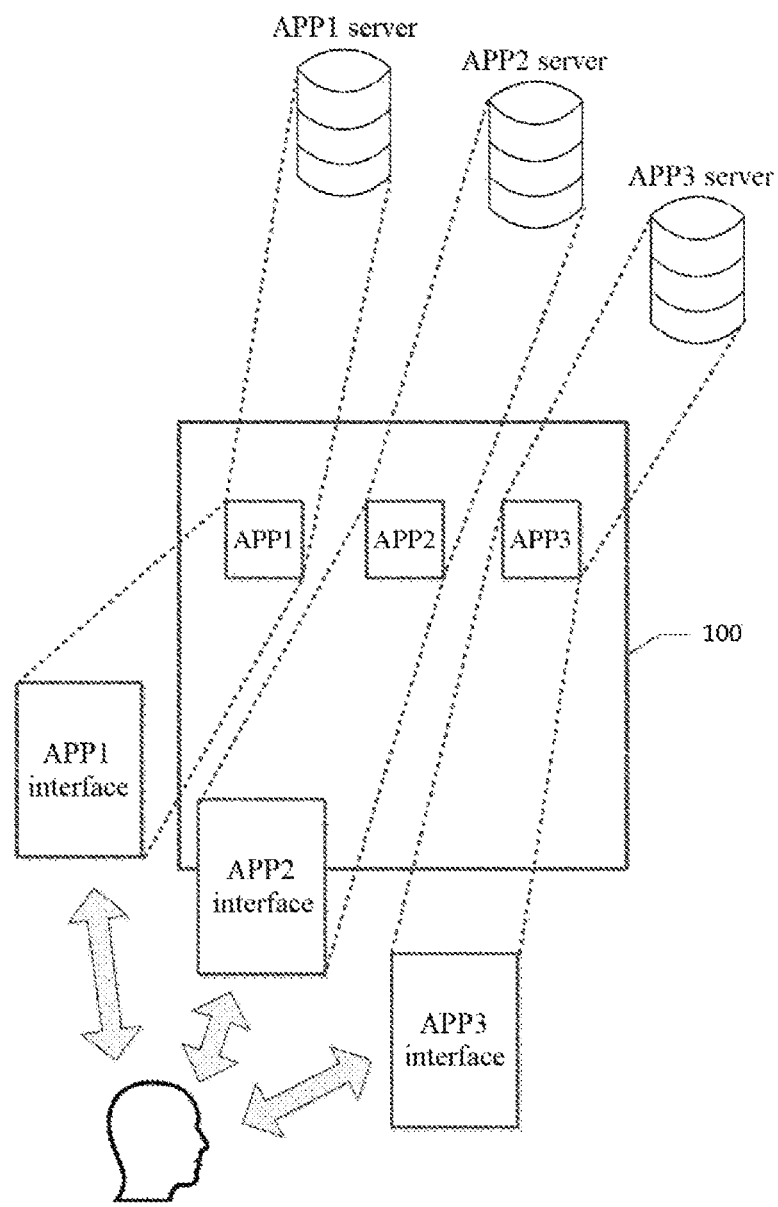
FIG. 1 schematically illustrates an application scenario of a method and apparatus of user data authorization based on blockchain according to an embodiment of the invention.

The principle and spirit of the invention will be described with reference to exemplary embodiments. It shall be understood that the embodiments are provided merely to enable those skilled in the art to better understand and implement the invention, without limiting the scope of the invention in any sense. Rather, the embodiments are provided such that the disclosure is thorough and complete, and the scope of the disclosure is completely conceivable by those skilled in the art.

It is apparent to those skilled in the art that, embodiments of the invention can be implemented as a system, an apparatus, a device, a method, or a computer program product. Therefore, the disclosure can be embodied as a pure hardware, a pure software (including firmware, resident software, microcode, etc.), or a combination of hardware and software.

Embodiments of the invention provide methods, apparatuses, media and computing devices of user data authorization based on blockchain.

In the disclosure, specific terms are used such as user data, encrypted user data, blockchain node, blockchain database, etc. "User data" can refer to user-related data which is generated by an interaction between an application client and a user, such as user's personal information, user's friend relationship, and the user's behavior data. User data is not limited to the exemplary examples. "Encrypted user data" can refer to a result of processing user data with a preset manner. The encrypted user data is different from the user data. A "blockchain node" can refer to a computing node that creates a blockchain network. Each blockchain node can correspond to a blockchain database. Each blockchain node can be capable of writing data to the corresponding blockchain database. A "blockchain database" can be created by linking one or more block data structures. The data stored in the blockchain database corresponding to each blockchain node can be the same. In addition, the number of an element illustrated in the drawings is merely exemplary rather than limiting, and a name of element is merely to distinguish the element from others without constructing any limitation.

The principle and spirit of the present invention will be described in detail with reference to representative embodiments of the invention.

Overview of Invention

In conceiving the invention, the inventors have discovered that, though the development of applications is rather rapid, the landscape is not changed as different applications are isolated from each other. For instance, data generated from an application cannot be shared with other applications. Behavior data or information data generated by an interaction of a user with an application is limited to the scope of use of the application, and it is not feasible to share the data with other applications or correlated with behavior data or information data generated by the user in other applications. It has been a problem to share user data between different applications on the premise of user data security.

Embodiments of the invention provide a method and device of user data authorization based on blockchain. From the perspective of a first application client, the method can comprise sending encrypted user data of user data to blockchain nodes, such that each of the blockchain nodes stores the encrypted user data in a corresponding blockchain databases; generating authorization information in response to a request of acquiring the user data by a second application client; and notifying the second application client to obtain the authorization information based on a preset rule, such that the second application client obtains the encrypted user data from a blockchain database corresponding to a blockchain node based on the authorization information and obtains the user data based on the encrypted user data and the authorization information. The encrypted user data of the user data can be stored in the blockchain database by the first application client, such that the encrypted user data cannot be tampered with, and a leak of corresponding real user data can be prevented by using the encrypted user data. When the second application client acquires the user data, the first application client can generate the authorization information corresponding to a request of the second application client, such that the second application client can obtain the user data based on the authorization information and the encrypted user data in the blockchain database. Therefore, a secure and effective user data authorization mechanism is provided to realize sharing of user data between different applications, realizing an interconnection and interoperability between different applications under the premise of date security.

Subsequent to the basic principles of the invention as discussed hereinabove, various non-limiting embodiments of the invention will be described below.

Overview of Application Scenarios

Application scenarios of a method and apparatus of user data authorization based on blockchain according to embodiments of the invention will be described with reference to FIG. 1.

FIG. 1 schematically illustrates an application scenario of a method and apparatus of user data authorization based on blockchain according to an embodiment of the invention. A terminal device 100 on which a plurality application clients APP1, APP2, APP3 are running can be included in the application scenario illustrated in FIG. 1. The application client APP1 can be connected to a back-end APP1 server through a network. The APP1 server can be configured to provide service and support for the application client APP1. A user can interact with the application client APP1 through an interface thereof. User data can be generated during the interaction between the application client APP1 and the user. The application client APP2 can be connected to a back-end APP2 server through a network. The APP2 server can be configured to provide service and support for the application client APP2. The user can interact with the application client APP2 through an interface thereof. User data can be generated during the interaction between the application client APP2 and the user. The application client APP3 can be connected to a back-end APP3 server through a network.

The APP3 server can be configured to provide service and support for the application client APP3. The user can interact with the application client APP3 through an interface thereof. User data can be generated during the interaction between the application client APP3 and the user.

The terminal device 100 can be various electronic devices having a display screen and supporting an operation of application clients. Examples of the terminal device 100 can including, but not limited to, a smart phone, a tablet computer, a laptop portable computer, a desktop computer, and the like. Each of the application clients APP1, APP2 and APP3 can be any application client, for example a social application client, an office application client, an entertainment application client, and so on. The APP1 server, the APP2 server and the APP3 server can be, but not limited to, a server or a server cluster. The network between the application client and the corresponding server can include various types of connection, such as wired or wireless communication links or fiber optic cables.

The method of user data authorization based on blockchain provided in embodiments of the invention and the device thereof can be performed at any one or more of the application clients APP1, APP2 and APP3. Once the method and apparatus of user data authorization based on block chain provided in embodiments of the invention are embodied, a sharing of user data can be realized between the application clients APP1, APP2 and APP3 through a blockchain-based user data authorization scheme.

It shall be understood that the number of terminal devices, application clients and servers illustrated in FIG. 1 is merely exemplary. Any number of terminal devices, application clients and servers can be implemented to meet practical needs.

Exemplary Method

A method of user data authorization based on blockchain according to an exemplary embodiment of the invention is described with reference to FIG. 2 and FIG. 3 under the application scenario of FIG. 1. It shall be noted that, the described application scenario is provided merely to better understand the spirit and principle of the invention, and embodiments of the invention are not limited thereto in any sense. Rather, embodiments of the invention can be implemented in any scenario where applicable.

Figure 2:
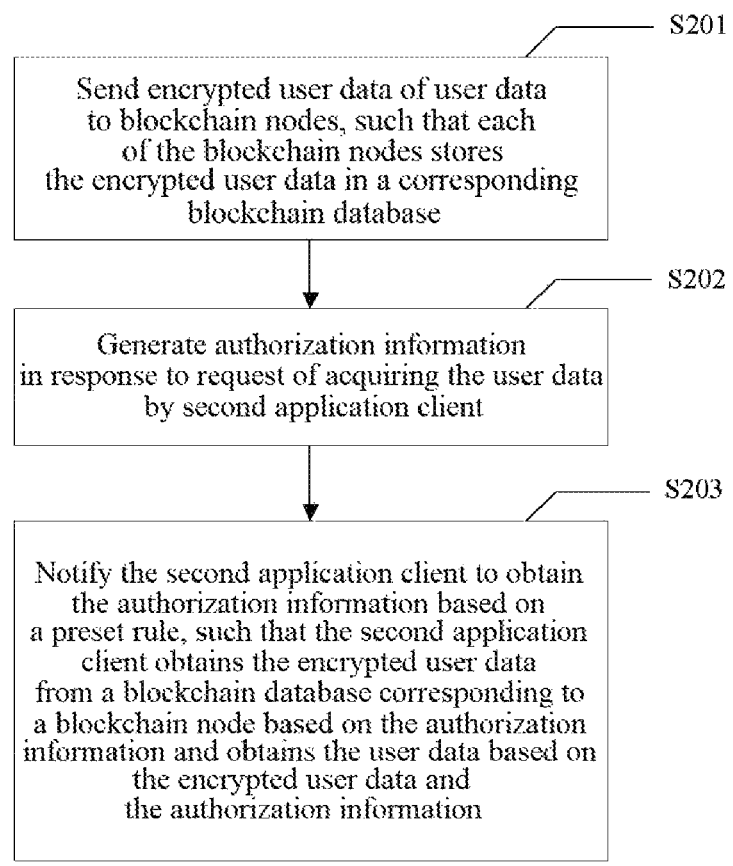
FIG. 2 schematically illustrates a flowchart of a method of user data authorization based on blockchain according to an embodiment of the invention.

FIG. 2 schematically illustrates a flowchart of a method of user data authorization based on blockchain according to an embodiment of the invention. The method can be performed at a first application client. As shown in FIG. 2, the method can comprise processes S201 to S203.

In process S201, encrypted user data of user data can be sent to blockchain nodes, such that each of the blockchain nodes stores the encrypted user data in a corresponding blockchain database.

In process S202, authorization information can be generated in response to a request of acquiring the user data by a second application client.

In process S203, the second application client can be notified to obtain the authorization information based on a preset rule, such that the second application client can obtain the encrypted user data from a blockchain database corresponding to a blockchain node based on the authorization information and obtain the user data based on the encrypted user data and the authorization information.

With the method of FIG. 2, the first application client can be configured to store the encrypted user data of the formed user data in the blockchain database through the blockchain node. In an aspect, the blockchain database can prevent date tampering, such that the encrypted user data stored in the blockchain database cannot be tampered with. In another aspect, a leak of corresponding real user data can be prevented by using the encrypted user data. When a second application client, which is different from the first application client, acquires the user data, a request can be sent from the second application client to the first application client. The first application client can generate authorization information corresponding to the request, such that the second application client can obtain the corresponding encrypted user data from the blockchain database based on the authorization information, and further obtain the corresponding user data based on the authorization information and the encrypted user data. Therefore, a secure and effective user data authorization mechanism is provided to realize sharing of user data between different applications, realizing an interconnection and interoperability between different applications under the premise of date security.

In some embodiments of the invention, the user data can be various user-related data generated in the process of the user interacting with the first application client. Example of user data can include user's personal information, user's friend relationship, and user's behavior data. The first application client can be any application client. Once the user data is generated, the first application client can generate encrypted user data based on the user data and send the encrypted user data to the blockchain nodes, such that each of the blockchain nodes stores the encrypted user data in a corresponding blockchain database.

In an embodiment, the blockchain network can comprise a plurality of blockchain endorsement nodes and blockchain consensus nodes. In some instances, the blockchain node in process S201 can be a blockchain endorsement node. The first application client can be configured to send the encrypted user data to the blockchain endorsement node. The blockchain endorsement node can send a request to the blockchain consensus node and wait for a consensus verification of data in a processing pool from the blockchain consensus node. Each of the blockchain endorsement nodes can store the encrypted user data in a corresponding blockchain database based on the consensus verification.

In an embodiment, the first application client sending the encrypted user data to a blockchain node can trigger a smart contract deployed in the blockchain node. A process of the blockchain endorsement node storing the encrypted user data in a corresponding blockchain database can be implemented by the blockchain node running the smart contract.

In an embodiment of the invention, in process S201, the encrypted user data of the user data can comprise encrypted user data obtained by encrypting the user data by using an encryption key. In process S202, generating authorization information can comprise generating the authorization information based on a decryption key corresponding to the encryption key and identification information of the encrypted user data. In process S203, the second application client obtaining the encrypted user data from a blockchain database corresponding to a blockchain node based on the authorization information and obtaining the user data based on the encrypted user data and the authorization information can comprise, after the second application client obtaining the authorization information, the second application client obtaining the encrypted user data from a blockchain database corresponding to a blockchain node based on the identification information of the encrypted user data in the authorization information and obtaining the user data by decrypting the encrypted user data using the decryption key in the authorization information.

In some embodiments, the method of FIG. 2 can further comprise receiving identification information of the encrypted user data which is returned from the blockchain node after the blockchain node storing the encrypted user data in the blockchain database.

For instance, after generating the user data X, the first application client can encrypt the user data X by using an encryption key P to obtain encrypted user data X'. A decryption key corresponding to the encryption key P can be P'. The first application client can send the encrypted user data X' to blockchain nodes, such that each of the blockchain nodes stores the encrypted user data X' in a corresponding blockchain database. The first application client can receive identification information of the encrypted user data X' which is returned by the blockchain node after the blockchain node storing the encrypted user data X' in the blockchain database. The identification information of the encrypted user data X' can indicate that the encrypted user data X' is stored in the blockchain database with a data structure indexed with the identification information of the encrypted user data X'. The first application client, in respond to a request of acquiring the user data X by a second application client, can generate authorization information based on the decryption key P' and the identification information of the encrypted user data X'. The first application client can notify the second application client. The second application client can obtain the authorization information based on a preset rule and obtain the corresponding encrypted user data X' from a blockchain database corresponding to any one of the blockchain nodes based on the identification information of the encrypted user data X' in the authorization information. Then, the encrypted user data X' can be decrypted using the decryption key P' in the authorization information to obtain the user data X. The processes described hereinabove can enable the first application client to authorize the second application client to use the user data X generated by the first application client.

In another embodiment of the invention, in process S201, the encrypted user data of the user data can comprise encrypted user data obtained by encrypting a hash value of the user data using the encryption key. In process S202, generating authorization information can comprise generating the authorization information based on a decryption key corresponding to the encryption key and identification information of the encrypted user data. In some instances, the second application client receiving the user data in a preset manner after sending a request for acquiring the user data to the first application client can comprise the first application client, in response to the request for acquiring the user data from the second application client, sending the corresponding user data which is locally stored to the second application client. Optionally, the second application client receiving the user data in a preset manner after sending a request for acquiring the user data to the first application client can comprise the first application client, in response to the request for acquiring the user data from the second application client, notifying a first application server, such that the first application server can send the corresponding user data which is stored in the first application server to the second application client. Optionally, the second application client receiving the user data in a preset manner after sending a request for acquiring the user data to the first application client can comprise the first application client, in response to the request for acquiring the user data from the second application client, notifying a third party storage server, such that can send the corresponding user data which is stored in the third party storage server to the second application client. Optionally, the second application client receiving the user data in a preset manner after sending a request for acquiring the user data to the first application client can comprise the second application client obtaining the corresponding user data from the first application server or the third party storage server. The process of the second application client receiving the user data in a preset manner is not limited to the examples described hereinabove. Though the second application client receives the user data so far, it may remain uncertain whether the received user data is the user data requested by the second application client. Therefore, in process S203, the second application client obtaining the encrypted user data from a blockchain database corresponding to a blockchain node based on the authorization information and obtaining the user based on the encrypted user data and the authorization information can comprise, after the second application client obtaining the authorization information, the second application client obtaining the encrypted user data from a blockchain database corresponding to a blockchain node based on the identification information of the encrypted user data in the authorization information, decrypting the encrypted user data using the decryption key in the authorization information to obtain a hash value of the user data, and confirming a receipt of the user data by verifying the received user data using the hash value.

In some embodiments, the method of FIG. 2 can further comprise receiving identification information of the encrypted user data which is returned from the blockchain node after the blockchain node storing the encrypted user data in the blockchain database.

For instance, after generating the user data X, the first application client can pre-store a backup of the user data X in the first application client locally, a first application server and/or a third-party storage server. Next, a hash value of the user data X can be calculated, and the hash value of the user data X can be encrypted using an encryption key P to obtain encrypted user data X'. A decryption key corresponding to the encryption key P can be P'. The first application client can send the encrypted user data X' to blockchain nodes, such that each of the blockchain nodes stores the encrypted user data X' in a corresponding blockchain database. The first application client can receive identification information of the encrypted user data X' which is returned by the blockchain node after the blockchain node storing the encrypted user data X' in the blockchain database indicate. The identification information of the encrypted user data X' can indicate that the encrypted user data X' is stored in the blockchain database with a data structure indexed with the identification information of the encrypted user data X'. Authorization information M can be generated based on the decryption key P' and the identification information of the encrypted user data X'. The process of sending the backup of the user data X to a second application client can be performed by the first application client, the first application server and/or the third-party storage server. The process of generating the authorization information and sending the user data X to the second application client is not limited to the exampled described hereinabove. The first application client can notify the second application client. The second application client can obtain the authorization information based on a preset rule and obtain the corresponding encrypted user data X' from a blockchain database corresponding to any one of the blockchain nodes based on the identification information of the encrypted user data X' in the authorization information. Then, the encrypted user data X' can be decrypted using the decryption key P' in the authorization information to obtain the hash value of the user data X. The second application client can verify whether the received backup of the user data X is the correct user data X based on the obtained hash value of the user data X. If the received backup of the user data X is the correct user data X, it can indicate that the backup of the user data X is not tampered with during a storage and/or transmission process and therefore it can be used. Otherwise, it can indicate that the backup of the user data X is tampered with during storage and/or transmission and therefore it cannot be used. The processes described hereinabove can enable the first application client to authorize the second application client to use the user data X generated by the first application client.

To further improve a security of the authorization process, in an embodiment of the invention, a public key and a private key of the second application client can be used in the process of the second application client obtaining authorization information. In some instances, identification information of the second application client and the public key of the second application client can be stored in association with each other in a blockchain database corresponding to a blockchain node. For instance, the public key of the second application client can be stored in the blockchain database with a data structure indexed by the identification information of the second application client. In an example, the data structure can be provided as a key-value pair, with the identification information of the second application client being a key and the public key of the second application client being a value. In some instances, the method of FIG. 2 can further comprise, obtaining identification information of the second application client in response to a request for acquiring the user data from the second application client, and obtaining the public key of the second application client from a block corresponding to a blockchain node based on the identification information of the second application client. In process S202, generating the authorization information based on the decryption obtaining the public key of the second application client from a block corresponding to a blockchain node based on the identification information of the second application client key corresponding to the encryption key and the identification information of the encrypted user data can comprise decrypting the decryption key and the identification information of the second application client using the public key of the second application client to obtain the authorization information. In some instances, once the second application client obtaining the authorization information, the second application client can decrypt the authorization information using the private key of the second application client to obtain the decryption key and the identification information of the encrypted user data.

In an embodiment of the invention, the encryption key for encrypting the user data or the hash value of the user data can be an encryption key that dynamically changes according to a preset change rule. For instance, the encryption key can be an encryption key that changes over different time periods. For instance, the encryption key can be an encryption key that changes over different user data. Accordingly, different encryption keys can correspond to different decryption keys. For a generated user data, an encryption key and a decryption key corresponding to the user data can be stored. The encryption key and the decryption key corresponding to each user data can be locally maintained at the first application client. The encryption key and the decryption key corresponding to each user data can also be maintained by another application client or a storage server. Maintenance of the encryption key and the decryption key is not limited to the examples discussed hereinabove. In some instances, an encryption key that changes over different time period can enable to control a time of valid for the authorization of the second application. For instance, once an authorization is granted from the first application, the granted authorization for the second application can be valid only in a certain period of time.

In an embodiment of the invention, the method of FIG. 2 can further comprise the first application client obtaining the identification information of the second application client in response to the request of acquiring the user data by the second application client. After generating the authorization information, the first application client can send the authorization information and the identification information of the second application client to the blockchain nodes, such that each of the blockchain nodes stores the authorization information in a corresponding blockchain database based on the identification information of the second application client. Therefore, the authorization information can be stored in the blockchain database with a data structure indexed with the identification information of the second application client. In some instances, in process 203, notifying the second application client to obtain the authorization information based on a preset rule can comprise notifying the second application client to obtain the authorization information from a blockchain database corresponding to a blockchain node based on the identification information of the second application client.

In embodiments of the invention, the authorization information cannot be tampered with by storing the authorization information in the blockchain database. In the blockchain database, a data structure indexed by the identification information of each application client can be stored. For instance, the data structure can be provided as a key-value pair, with the identification information of the application client being a key and the relevant data of the authorization information being a value. The related data of the authorization information can be the authorization information itself or a multi-element data including the authorization information and other information. For instance, in the data structure indexed by the identification information of the second application client, one or more authorization information corresponding to the user data can be stored. Different authorization information can be discriminated by different identifiers (e.g., serial numbers), timestamps, or user identification information. A discrimination of different authorization information is not limited to the examples discussed hereinabove. For instance, in the process the second application client obtaining authorization information M based on a preset rule, related data of the authorization information, which is indexed with the identification information of the second application client, can first be searched in a blockchain database corresponding to any one of the blockchain nodes based on the identification information of the second application client. Then, the authorization information M can be searched from the related data of the authorization information based on a serial number, a timestamp and/or a user identification information.

In an embodiment of the invention, prior to granting an authorization to the second application client, a permission of the second application client can be checked to determine whether the second application client can be granted an authorization. In some instances, in process S202 of the method shown in FIG. 2, generating the authorization information in response to a request for acquiring the user data by the second application client can comprise determining whether the second application client has a permission of acquisition and generating the authorization information if the second application client has the permission of acquisition.

In an example, determining whether the second application client has a permission of acquisition can be performed by querying the user. For instance, determining whether the second application client has a permission of acquisition can comprise displaying an authorization query dialog box; if a positive input is received for the authorization query, determining the second application client has the permission of acquisition; and if a negative input is received for an authorization query, determining the second application client does not have the permission of acquisition.

Figure 3:
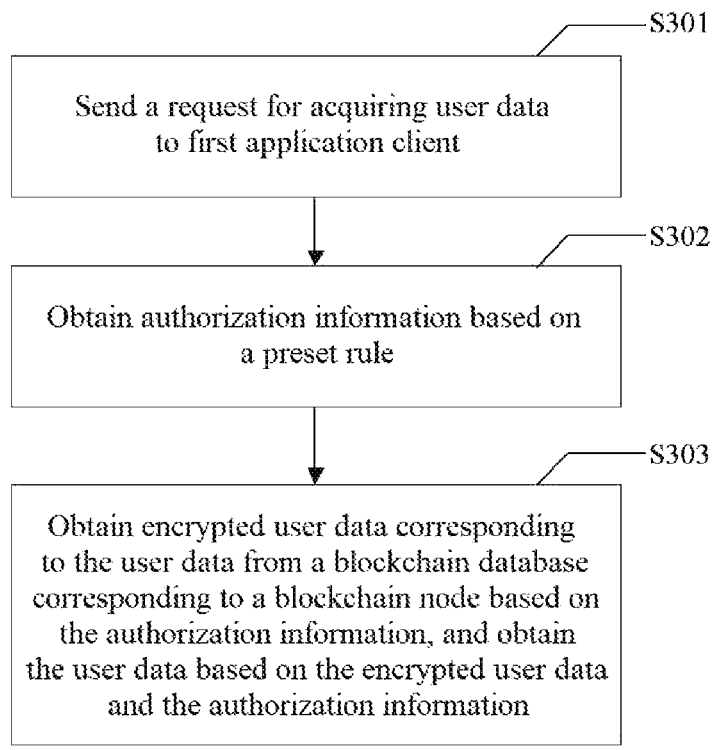
FIG. 3 schematically illustrates a flowchart of a method of user data authorization based on blockchain according to another embodiment of the invention.

FIG. 3 schematically illustrates a flowchart of a method of user data authorization based on blockchain according to another embodiment of the invention. The method can be performed at a second application client. As shown in FIG. 3, the method can comprise processes S301 to S303.

In process S301, a request for acquiring user data can be sent to a first application client.

In process S302, authorization information can be obtained based on a preset rule.

In process S303, encrypted user data corresponding to the user data can be obtained from a blockchain database corresponding to a blockchain node based on the authorization information, and the user data can be obtained based on the encrypted user data and the authorization information.

With the method shown in FIG. 3, when user data generated by a first application client, which is different from the second application client, is required by the second application client, a request for acquiring user data can be sent to the first application client. Authorization information can be obtained, and corresponding encrypted user data can be obtained from a blockchain database based on the authorization information. Further, corresponding user data can be obtained based on the authorization information and the encrypted user data. The encrypted user data can be stored in the blockchain database. In an aspect, the blockchain database can prevent date tampering, such that the encrypted user data cannot be tampered with. In another aspect, a leak of corresponding real user data can be prevented by using the encrypted user data. Therefore, a secure and effective user data authorization mechanism is provided to realize sharing of user data between different applications, realizing an interconnection and interoperability between different applications under the premise of date security.

In an embodiment of the invention, the encrypted user data of the user data can comprise encrypted user data obtained by encrypting the user data by using an encryption key. The authorization information can be generated based on a decryption key corresponding to the encryption key and identification information of the encrypted user data. In process S303, obtaining encrypted user data corresponding to the user data can be obtained from a blockchain database corresponding to a blockchain node based on the authorization information can comprise obtaining the encrypted user data from a blockchain database corresponding to a blockchain node based on the identification information of the encrypted user data in the identification information. In process S303, obtaining the user data based on the encrypted user data and the authorization information can comprise decrypting the encrypted user data using the decryption key in the authorization information to obtain the user data.

In another embodiment of the invention, the encrypted user data of the user data can comprise the encrypted user data obtained by encrypting a hash value of the user data using the encryption key. The authorization information can be generated based on the decryption key corresponding to the encryption key and identification information of the encrypted user data. In some instances, the method of FIG. 3 can further comprise the second application client receiving a backup of the user data pre-stored in the first application client, a first application server and/or a storage server. In process S303, obtaining the encrypted user data corresponding to the user data from a blockchain database corresponding to a blockchain node based on the authorization information can comprise obtaining the encrypted user data from a blockchain database corresponding to a blockchain node based on the identification information of the encrypted user data in the authorization information. In process S303, obtaining the user data based on the encrypted user data and the authorization information can comprise decrypting the encrypted user data using the decryption key in the authorization information to obtain a hash value of the user data, and confirming a receipt of the user data by verifying the backup of the user data using the hash value.

In an embodiment of the invention, identification information of the second application client and the authorization information can be stored in association with each other in a blockchain database corresponding to a blockchain node. In process S303, obtaining the authorization information based on a preset rule can comprise obtaining the authorization information from a blockchain database corresponding to a blockchain node based on the identification information of the second application client.

In some embodiments, the authorization information can be stored in the blockchain database to ensure the authorization information not being tampered with. In the blockchain database, a data structure indexed by the identification information of each application client can be stored. For instance, the data structure can be provided as a key-value pair, with the identification information of the application client being a key and the relevant data of the authorization information being a value. The related data of the authorization information can be the authorization information itself or a multi-element data including the authorization information and other information. For instance, in the data structure indexed by the identification information of the second application client, one or more authorization information corresponding to the user data can be stored. Different authorization information can be discriminated by different identifiers (e.g., serial numbers), timestamps, or user identification information. A discrimination of different authorization information is not limited to the examples discussed hereinabove. For instance, in the process the second application client obtaining authorization information M based on a preset rule, related data of the authorization information, which is indexed with the identification information of the second application client, can first be searched in a blockchain database corresponding to any one of the blockchain nodes based on the identification information of the second application client. Then, the authorization information M can be searched from the related data of the authorization information based on a serial number, a timestamp and/or a user identification information.

To further improve a security of the authorization process, in an embodiment of the invention, a public key and a private key of the second application client can be used in the process of the second application client obtaining authorization information. In some instances, the method of FIG. 3 can further comprise sending the identification information of the second application client and the public key of the second application client to blockchain nodes, such that each of the blockchain nodes stores the public key of the second application client in a corresponding blockchain database based on the identification information of the second application client. For instance, the public key of the second application client can be stored in the blockchain database with a data structure indexed by the identification information of the second application client. In an example, the data structure can be provided as a key-value pair, with the identification information of the second application client being a key and the public key of the second application client being a value. The authorization information can be generated by encrypting the decryption key and the identification information of the encrypted user data using the public key of the second application client. In process S303, obtaining the encrypted user data corresponding to the user data from a blockchain database corresponding to a blockchain node based on the authorization information and obtaining the user data based on the encrypted user data and the authorization information can comprise decrypting the authorization information using the private key of the second application client to obtain the decryption key and identification information of the encrypted user data. In some instances, sending the identification information of the second application client and the public key of the second application client to blockchain nodes can comprising the second application client sending the identification information and the public key directly to the blockchain nodes or a second application server sending the identification information and the public key directly to the blockchain nodes The method of FIG. 2 and FIG. 3 can be illustrated with an exemplary example where the first application client generates user data X. The first application client can send encrypted user data X' to blockchain nodes to trigger a first smart contract deployed in a blockchain node, such that each of the blockchain nodes stores the encrypted user data X' in a corresponding blockchain database. The first application client can receive identification information of the encrypted user data which is returned from the blockchain node after the blockchain node storing the encrypted user data in the blockchain database. The first application client can maintain or entrust other parties to maintain an encryption key P and a decryption key P' corresponding to the user data X. The second application client can generate a public key and a private key. Identification information of the second application client and the public key of the second application client can be sent to the blockchain nodes by the second application client a second application server, such that each of the blockchain nodes stores the public key of the second application client in the corresponding blockchain database based on the identification information of the second application client.

If the second application client requires the user data X generated by the first application client, the second application client can call an authorization component of the first application client. The second application client can send the identification information of the second application client to the first application client through a corresponding interface of the authorization component. An authorization query dialog box can be shown on a screen of the first application client. If the user's positive input is received for the authorization query, it is determined that the second application client has the permission of acquisition and therefore an authorization process can be triggered.

The first application client can call a second smart contract deployed in the blockchain node based on the identification information of the second application client that is sent when the second application client triggers the authorization query dialog box, such that an application information of the second application client which is indexed by the identification information of the second application client can be searched. The first application client can obtain the public key of the second application client from the application information of the second application client. The first application client can encrypt the identification information of the decryption key P' and the encrypted user data X' using the public key of the second application client to obtain the authorization information M. The first application client can send the identification information of the second application client and the obtained authorization information M to the blockchain nodes to trigger a third smart contract deployed in the blockchain nodes, such that each of the blockchain nodes stores the authorization information M in a corresponding blockchain based on the identification information of the second application client. The authorization information M can be stored in the blockchain database with a data structure indexed by the identification information of the second application client. If the authorization query dialog popped up at the first application client is closed, the second application client can be notified through an interface call.

Once receiving the notification, the second application client can obtain the authorization information M from the blockchain database based on the identification information of the second application client by calling a fourth smart contract deployed in the blockchain node. The second application client can decrypt the authorization information M using the private key of the second application client to obtain the decryption key P' and the identification information of the encrypted user data X' in the authorization information M. The second application client can obtain the encrypted user data X' from the blockchain database based on the identification information of the encrypted user data X' by calling a fifth smart contract deployed in the blockchain node. Then the user data X' can be decrypted using the decryption key P' to obtain the user data X or a hash value of the user data X.

Exemplary Apparatus

Figure 4:
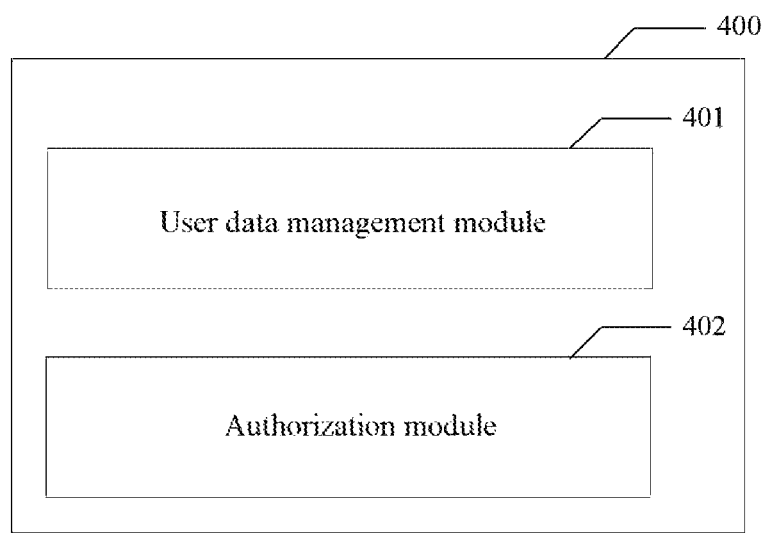
FIG. 4 schematically illustrates a block diagram of an apparatus of user data authorization based on blockchain according to an embodiment of the invention.
Figure 5A:
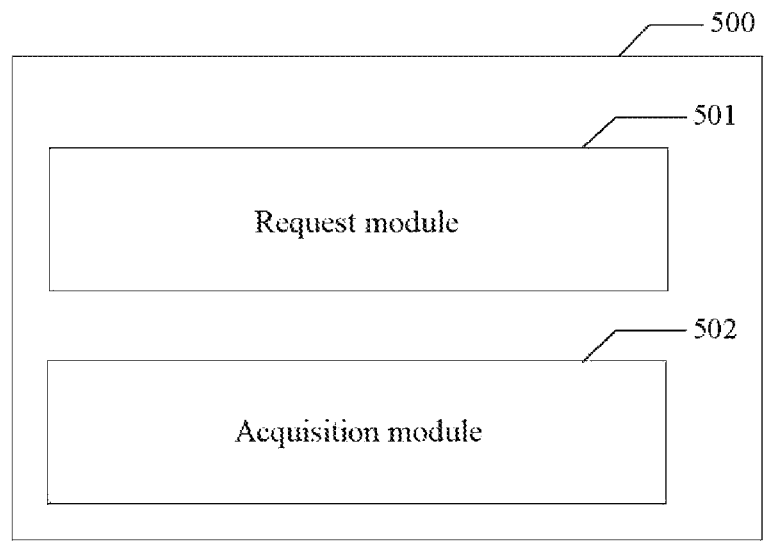
FIG. 5A schematically illustrates a block diagram of a user data authorization apparatus based on blockchain according to another embodiment of the invention.
Figure 5B:
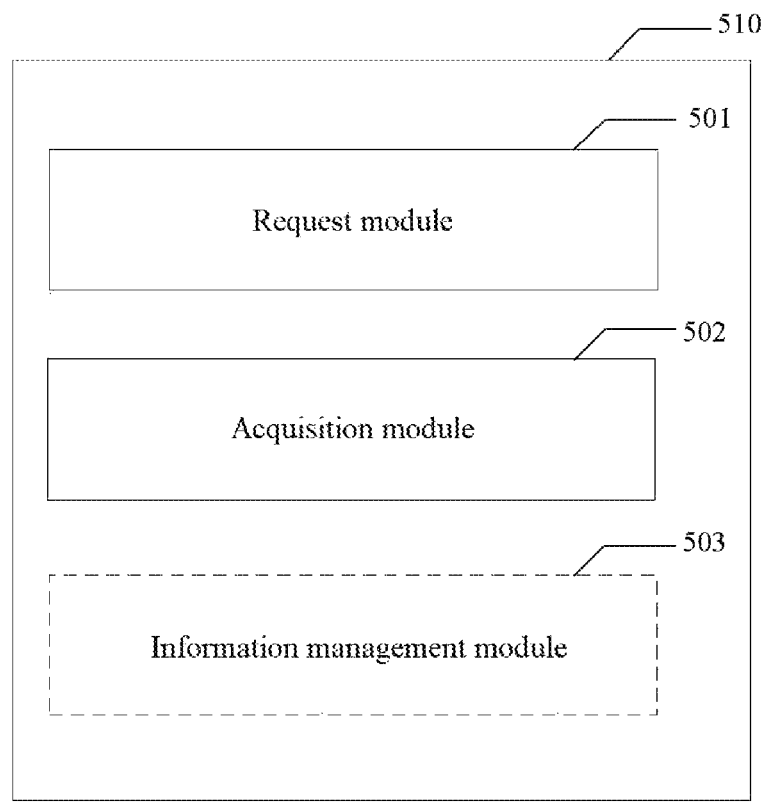
FIG. 5B schematically illustrates a block diagram of a user data authorization apparatus based on blockchain according to yet another embodiment of the invention.

Subsequent to the method of exemplary embodiments of the invention, FIG. 4 to FIG. 5B illustrate an apparatus for user data authorization based on blockchain according to exemplary embodiments of the invention.

FIG. 4 schematically illustrates a block diagram of an apparatus of user data authorization based on blockchain according to an embodiment of the invention. The apparatus can be used with a first application client. As shown in FIG. 4, the apparatus 400 of user data authorization based on blockchain can comprise user data management module 401 and an authorization module 402. The user data management module 401 can be configured to send encrypted user data of user data to blockchain nodes, such that each of the blockchain nodes stores the encrypt the data in a corresponding blockchain database. The authorization module 402 can be configured to generate authorization information in response to a request for acquiring the user data from the second application client, and notify the second application client to obtain the authorization information based on a preset rule, such that the second application client obtains the encrypted user data from a blockchain database corresponding to a blockchain node based on the authorization information and obtains the user data based on the encrypted user data and the authorization information.

With the apparatus of FIG. 4, the first application client can be configured to store the encrypted user data of the formed user data in the blockchain database through the blockchain node. In an aspect, the blockchain database can prevent date tampering, such that the encrypted user data stored in the blockchain database cannot be tampered with. In another aspect, a leak of corresponding real user data can be prevented by using the encrypted user data. When a second application client, which is different from the first application client, acquires the user data, a request can be sent from the second application client to the first application client. The first application client can generate authorization information corresponding to the request, such that the second application client can obtain the corresponding encrypted user data from the blockchain database based on the authorization information, and further obtain the corresponding user data based on the authorization information and the encrypted user data. Therefore, a secure and effective user data authorization mechanism is provided to realize sharing of user data between different applications, realizing an interconnection and interoperability between different applications under the premise of date security.

In an embodiment of the invention, the encrypted user data of the user data can comprise encrypted user data obtained by encrypting the user data using an encryption key. The authorization module 402 can be configured to generate the authorization information based on a decryption key corresponding to the encryption key and identification information of the encrypted user data. Once obtaining the authorization information, the second application client can obtain the encrypted user data from a blockchain database corresponding to a blockchain node based on the identification information of the encrypted user data and obtain the user data by decrypting the encrypted user data using the decryption key.

In another embodiment of the invention, the encrypted user data of the user data can comprise encrypted user data obtained by encrypting a hash value of the user data using the encryption key. The authorization module 402 can be configured to generate the authorization information based on a decryption key corresponding to the encryption key and the identification information of the encrypted user data. Once obtaining the authorization information, the second application client can obtain the encrypted user data from a blockchain database corresponding to a blockchain node based on the identification information of the encrypted user data, obtain a hash value of the user data by decrypting the encrypted user data using the decryption key, and confirm a receipt of the user data by verifying the received user data using the hash value.

In an embodiment of the invention, the authorization module 402 can be further configured to send the identification information of the second application client and the authorization information to blockchain nodes after generating the authorization information, such that each of the blockchain nodes stores the authorization information in a corresponding blockchain database based on the identification information of the second application client. In some instances, the authorization module 402 can be configured to notify the second application client, such that the second application client obtains the authorization information from a blockchain database corresponding to a blockchain node based on the identification information of the second application client.

In one embodiment of the invention, the identification information of the second application client and a public key of the second application client can be stored in association with each other in a blockchain database corresponding to a blockchain node. The authorization module 402 can be further configured to obtain the identification information of the second application client and obtain the public key of the second application client from a blockchain database corresponding to a blockchain node based on the identification information of the second application client. In some instances, the authorization module 402 can be configured to obtain the authorization information by encrypting the decryption key and the identification information of the encrypted user data using the public key of the second application client. Once obtaining the authorization information, the second application client can decrypt the authorization information using the private key of the second application client to obtain the decryption key and the identification information of the encrypted user data.

In an embodiment of the invention, the authorization module 402 can be further configured to determine whether the second application client has a permission of acquisition in response to the request of acquiring the user data by the second application client and generate the authorization information if the second application client has a permission of acquisition.

In some instances, the authorization module 402 can be configured to display an authorization query dialog box. If a positive input for the authorization query is received, it can be determined that the second application client has the permission of acquisition. However, if a negative input for the authorization query is received, it can be determined that the second application client does not have the permission of acquisition.

In an embodiment of the invention, the encryption key can comprise an encryption key that changes based on a preset change rule.

In an embodiment of the invention, the user data management module 401 can be further configured to receive identification information of the encrypted user data which is returned by the blockchain node after the blockchain node storing the encrypted user data in the blockchain database.

FIG. 5A schematically illustrates a block diagram of an apparatus of user data authorization based on blockchain according to another embodiment of the invention. The apparatus can be used with a second application client. As shown in FIG. 5A, the apparatus 500 of user data authorization based on blockchain can comprise a request module 501 and an acquisition module 502. The request module 501 can be configured to send a request for acquiring user data to a first application client. The acquisition module 502 can be configured to obtain authorization information based on a preset rule, obtain encrypted user data corresponding to the user data from a blockchain database corresponding to a blockchain node based on the authorization information, and obtain the user data based on the encrypted user data and the authorization information.

With the apparatus of FIG. 5A, when user data generated by a first application client, which is different from the second application client, is required by the second application client, a request for acquiring user data can be sent to the first application client. Authorization information can be obtained, and corresponding encrypted user data can be obtained from a blockchain database based on the authorization information. Further, corresponding user data can be obtained based on the authorization information and the encrypted user data. The encrypted user data can be stored in the blockchain database. In an aspect, the blockchain database can prevent date tampering, such that the encrypted user data cannot be tampered with. In another aspect, a leak of corresponding real user data can be prevented by using the encrypted user data. Therefore, a secure and effective user data authorization mechanism is provided to realize sharing of user data between different applications, realizing an interconnection and interoperability between different applications under the premise of date security.

In an embodiment of the invention, the encrypted user data of the user data can comprise encrypted user data obtained by encrypting the user data using an encryption key. The authorization information can be generated based on a decryption key corresponding to the encryption key and identification information of the encrypted user data. The acquisition module 502 can be configured to obtain the encrypted user data from a blockchain database corresponding to a blockchain node based on the identification information of the encrypted user data and obtain the user data by decrypting the encrypted user data using the decryption key.

In another embodiment of the invention, the encrypted user data of the user data can comprise encrypted user data obtained by encrypting a hash value of the user data using the encryption key. The authorization information can be generated based on a decryption key corresponding to the encryption key and the identification information of the encrypted user data. The acquisition module 502 can be configured to obtain the encrypted user data from a blockchain database corresponding to a blockchain node based on the identification information of the encrypted user data, obtain a hash value of the user data by decrypting the encrypted user data using the decryption key, and confirm a receipt of the user data by verifying the received user data using the hash value.

In an embodiment of the invention, the identification information of the second application client and the authorization information can be stored in association with each other in a blockchain database corresponding to a blockchain node. The acquisition module 502 can be configured to obtain the authorization information from a blockchain database corresponding to a blockchain node based on the identification information of the second application client.

FIG. 5B schematically illustrates a block diagram of an apparatus of user data authorization based on blockchain according to still another embodiment of the invention. The apparatus can be used with a second application client. As shown in FIG. 5B, the apparatus 510 of user data authorization based on blockchain can comprise a request module 501, an acquisition module 502 and an information management module 503. The request module 501 and the acquisition module 502 have been described hereinabove, and a description thereof will be omitted for conciseness.

The information management module 503 can be configured to send the identification information of the second application client and the public key of the second application client to the blockchain nodes. Optionally, the information management module 503 can be configured to send the identification information of the second application client and the public key of the second application client to the blockchain nodes through a second application server. Therefore, each of the blockchain nodes stores the public key of the second application client to a corresponding blockchain database based on the identification information of the second application client.

The acquisition module 502 can be configured to decrypt the authorization information using the private key of the second application client to obtain the decryption key and identification information of the encrypted user data.

In some instances, the authorization information can be generated by encrypting the decryption key and the identification information of the encrypted user data using the public key of the second application client.

It shall be noted that, the implementation, intended technical problems, functionalities and the technical effects of each module or unit or sub-unit in the embodiments for devices can be same with or similar to the implementation, intended technical problems, functionalities and the technical effects in the embodiments for methods. Any repetitive description will be omitted for conciseness.

Exemplary Media

Subsequent to the method and apparatus of exemplary embodiments of the invention, description is provided to a medium of user data authorization according to exemplary embodiments of the invention.

Exemplary embodiments of the invention provide a medium that stores computer-executable instructions. When executed by a processor, the instructions can implement a method of user data authorization based on blockchain according to any embodiment described hereinabove in the disclosure.

In some embodiments, aspects of the invention can be implemented as a program product which includes program code. When executed on a computing device, the program code can direct the computing device to execute the processes in a method of user data authorization based on blockchain according to any embodiment of the discourse described hereinabove in the "exemplary method" section. For instance, the computing device can be directed to perform the processes S201, S202 and S203 in FIG. 2. In process S201, encrypted user data of user data can be sent to blockchain nodes, such that each of the blockchain nodes stores the encrypted user data in a corresponding blockchain database. In process S202, authorization information can be generated in response to a request of acquiring the user data by a second application client. In process S203, the second application client can be notified to obtain the authorization information based on a preset rule, such that the second application client can obtain the encrypted user data from a blockchain database corresponding to a blockchain node based on the authorization information and obtain the user data based on the encrypted user data and the authorization information. The computing device can also be directed to perform the processes in FIG. 3.

The program product can comprise any combination of one or more readable media. The readable medium can be a readable signal medium or a readable storage medium. The readable storage medium can be, for example, but not limited to, an electrical, magnetic, optical, electromagnetic, infrared or semiconductor system, apparatus or device, or any combination thereof. Examples (e.g., non-exhaustive list) of readable storage medium can comprise an electrical connection with one or more wires, a portable disk, a hard disk, random access memory (RAM), read-only memory (ROM), erasable programmable read-only memory (EPROM or flash memory), optical fiber, portable compact disc read-only memory (CD-ROM), optical storage device, magnetic storage device, or any combination thereof.

Figure 6:
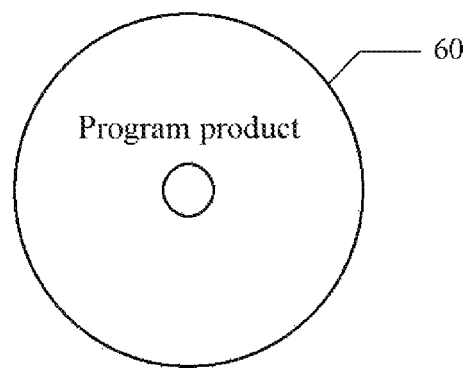
FIG. 6 schematically shows a schematic diagram of a computer-readable storage medium product according to an embodiment of the invention.

FIG. 6 schematically shows a schematic diagram of a computer-readable storage medium product according to an embodiment of the invention. FIG. 6 illustrates a program product 600 of user data authorization based on blockchain according to an embodiment of the invention. The program product can be provided as a portable compact disk read-only memory (CD-ROM) which includes program code. The program product can be executed on a computing device, such as a personal computer. However, the program product of the invention is not limited thereto. The readable storage medium of the disclosure can be any tangible medium containing or storing a program. The program can be used by or in combination with an instruction executing system, an apparatus or a device.

The readable signal medium can include a data signal that is in a baseband or propagated as a portion of a carrier wave, in which readable program code is carried. The propagated data signal can be provided with a plurality of forms, including but not limited to, electromagnetic signals, optical signals or any combination thereof. The readable signal medium can be any readable medium other than a readable storage medium, which readable medium can send, propagate or transmit a program that is used by or in combination with an instruction executing system, an apparatus or a device.

Program code on the readable medium can be transmitted using any appropriate medium, including but not limited to wireless, wire, optical fiber cable, RF, or any combination of above.

The program code for performing the processes of the invention can be coded in any combination of one or more programming languages. The programming language can include an object-oriented programming language such as Java or C++. The programming language can also include conventional procedural programming language such as C language or other similar programming languages. The program code can be executed entirely on a user computing device, partly on the user device, as an independent software package, partly on the user computing device and partly on a remote computing device, or entirely on the remote computing device or a server. In case a remote computing device is used, the remote computing device can be connected to the user computing device through any network including a local area network (LAN) or a wide area network (WAN). The remote computing device can alternatively be connected to an external computing device (e.g., connecting through an internet connection provided by an internet service provider).

Exemplary Computing Device

Subsequent to the methods, media and devices of exemplary embodiment of the present invention, description is provided to a computing device of user data authorization based on blockchain according to another exemplary embodiment of the invention.

Embodiment of the invention further provides a computing device. The computing device can comprise a memory, a processor, and executable instructions which are stored on the memory and executable by the processor. When executed by the processor, the instructions can implement a method of user data authorization based on blockchain according to any exemplary embodiment of the invention.

Those skilled in the art can understand that, various aspects of the present invention can be implemented as a system, a method or a program product. Therefore, various aspects of the present invention can be embodied as a pure hardware, a pure software (including firmware, microcode, etc.), or a combination of hardware and software, which can be collectively referred to herein as circuit, module or system.

In some embodiments, the computing device of user data authorization based on blockchain in the present invention can comprise at least one processing unit and at least one storage unit. The storage unit can store program code. When executed by the processing unit, the program code can direct the processing unit to execute the processes in a method for of user data authorization based on blockchain according to any embodiment of the discourse described hereinabove in the "exemplary method" section. For instance, the computing device can be directed to perform the processes S201, S202 and S203 in FIG. 2. In process S201, encrypted user data of user data can be sent to blockchain nodes, such that each of the blockchain nodes stores the encrypted user data in a corresponding blockchain database. In process S202, authorization information can be generated in response to a request of acquiring the user data by a second application client. In process S203, the second application client can be notified to obtain the authorization information based on a preset rule, such that the second application client can obtain the encrypted user data from a blockchain database corresponding to a blockchain node based on the authorization information and obtain the user data based on the encrypted user data and the authorization information. The computing device can also be directed to perform the processes in FIG. 3.

A computing device 70 of user data authorization based on blockchain according to embodiments of invention is described with reference to FIG. 7. The computing device 70 in FIG. 7 is merely an example which imposes no limitation on the function and scope of use of embodiments of the invention.

Figure 7:
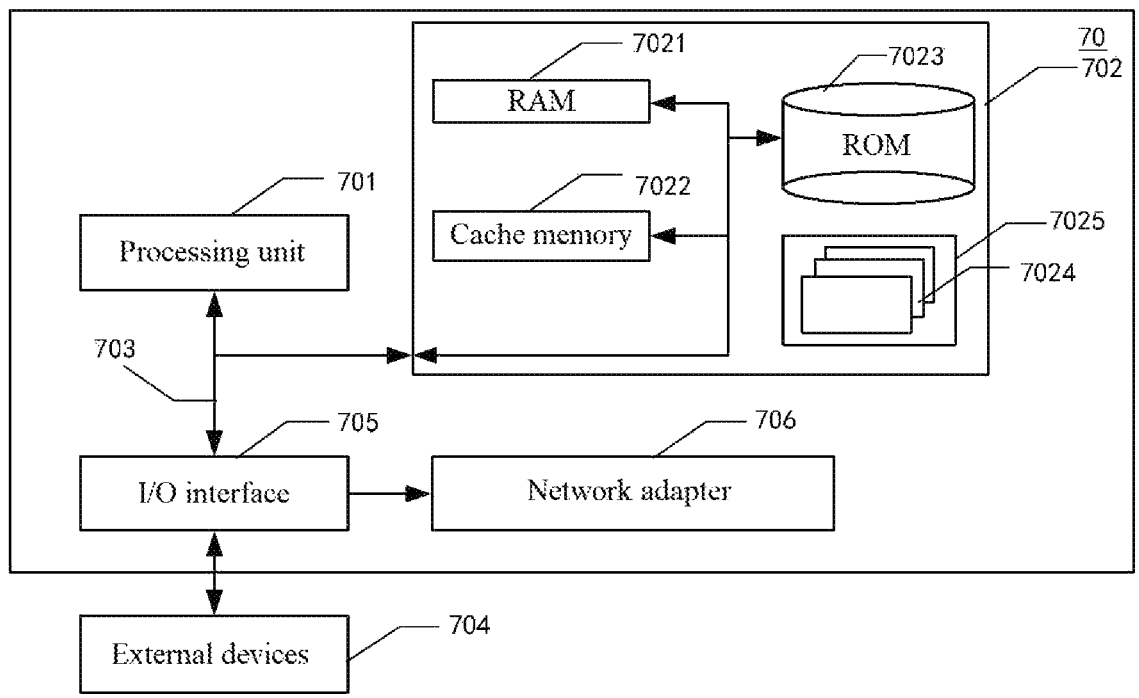
FIG. 7 schematically illustrates a block diagram of a computing device according to an embodiment of the invention.

As shown in FIG. 7, the computing device 70 can be embodied as a general-purpose computing device. Components of the computing device 70 can comprise, but are not limited to, the at least one processing unit 701, the at least one storage unit 702, and a bus 703 connecting various system components (e.g., including the storage unit 702 and the processing unit 701).

The bus 703 can comprise one or more types of bus structures, including a memory bus or a memory controller, a peripheral bus, a graphics acceleration port, a processor, or a local area bus using any of a variety of bus structures.

The storage unit 702 can comprise a readable medium which is a volatile memory, such as a random access memory (RAM) 7021 and/or a cache memory 7022. The storage unit 702 can further comprise a read-only memory (ROM) 7023.

The storage unit 702 can further comprise a program/utility tool 7025 having a set (e.g., at least one) of program modules 7024. The program modules 7024 include, but are not limited to, an operating system, one or more application programs, other program modules, and program data. Each or a combination of these examples can include an implementation of a network environment.

The computing device 70 can communicate with one or more external devices 704 (e.g., keyboard, pointing device, Bluetooth device, etc.), communicate with one or more devices that enable users to interact with the computing device 70, and/or communicate with any device (e.g., router, modem, etc.) that enables the computing device 70 in communication with one or more other computing devices. Such communication can be performed through an input/output (I/O) interface 705. Furthermore, the computing device 70 can communicate with one or more networks (such as a local area network (LAN), a wide area network (WAN), and/or a public network such as the Internet) through a network adapter 706. As shown, the network adapter 706 can communicate with other modules of the computing device 70 through the bus 703. It shall be understood that, though not shown in the drawings, other hardware and/or software modules can be used in combination with the computing device 70, which hardware and/or software modules including but not limited to microcode, a device driver, a redundant processing unit, an external disk drive array, a RAID system, a tape driver and a data backup storage system.

It shall be noted that, although units/modules or sub-units/sub-modules of the apparatus of user data authorization based on blockchain are described hereinabove, this division is merely exemplary but not mandatory. In some embodiments of the invention, the features and functions of two or more units/modules described hereinabove can be embodied in one unit/module. Similarly, the features and functions of one unit/module described hereinabove can be further divided into and embodied in multiple units/modules.

Furthermore, although processes of method of the invention are described in a specific order in the drawings, it does not require or imply that the processes have to be performed in that specific order or that all of the processes have to be performed to achieve the desired result. Additionally or alternatively, certain processes can be omitted, multiple processes can be combined into process, and/or one process can be divided into multiple processes.

It shall be understood that, while the spirit and principle of the invention have been described with reference to specific embodiments, the invention is not limited to the specific embodiments disclosed. A partition of various aspects of the invention does not prohibit a combination of features in these aspects to benefit, and such partition is merely provided for convenience of description. The invention shall also cover various modifications and equivalents that are within the spirit and scope of the appended claims.

The invention claimed is:

1. A method of user data authorization based on blockchain, said method being performed at a first application client and comprising:
sending encrypted user data of user data to blockchain nodes, such that each of the blockchain nodes stores the encrypted user data in a corresponding blockchain database;
generating authorization information in response to a request of acquiring the user data by a second application client; and
notifying the second application client to obtain the authorization information based on a preset rule, such that the second application client obtains the encrypted user data from a blockchain database corresponding to a blockchain node based on the authorization information and obtains the user data based on the encrypted user data and the authorization information,
wherein the encrypted user data of the user data comprises encrypted user data obtained by encrypting the user data using an encryption key,
wherein generating authorization information comprises generating the authorization information based on a decryption key corresponding to the encryption key and identification information of the encrypted user data,
wherein the second application client obtaining the encrypted user data from a blockchain database corresponding to a blockchain node based on the authorization information and obtaining the user data based on the encrypted user data and the authorization information comprises, after obtaining the authorization information, the second application client obtaining the encrypted user data based on the identification information of the encrypted user data in the authorization information and obtaining the user data by decrypting the encrypted user data using the decryption key in the authorization information, wherein the identification information of the second application client and a public key of the second application client are stored in association with each other in the blockchain database, wherein the method further comprises obtaining the identification information of the second application client, and obtaining the public key of the second application client from a block corresponding to the blockchain node based on the identification information of the second application client, wherein generating the authorization information based on a decryption key corresponding to the encryption key and identification information of the encrypted user data comprises generating the authorization information by encrypting the decryption key and the identification information of the encrypted user data using the public key of the second application client, and wherein once obtaining the authorization information, the second application client decrypts the authorization information using a private key of the second application client to obtain the decryption key and the identification information of the encrypted user data.

2. The method of claim 1, wherein the encrypted user data of the user data comprises encrypted user data obtained by encrypting a hash value of the user data using the encryption key, wherein the second application client obtaining the encrypted user data from a blockchain database corresponding to a blockchain node based on the authorization information and obtaining the user based on the encrypted user data and the authorization information comprises, after obtaining the authorization information, the second application client decrypting the encrypted user data using the decryption key in the authorization information to obtain a hash value of the user data, and confirming a receipt of the user data by verifying the received user data using the hash value.

3. The method of claim 1, further comprising, after generating the authorization information, sending the authorization information and the identification information of the second application client to the blockchain nodes, such that each of the blockchain nodes stores the authorization information in a corresponding blockchain database based on the identification information of the second application client, wherein notifying the second application client to obtain the authorization information based on a preset rule comprises notifying the second application client to obtain the authorization information from the blockchain database based on the identification information of the second application client.

4. The method of claim 1, wherein generating the authorization information in response to a request for acquiring the user data by the second application client comprises determining whether the second application client has a permission of acquisition and generating the authorization information if the second application client has the permission of acquisition.

5. The method of claim 4, wherein determining whether the second application client has a permission of acquisition comprises:
   displaying an authorization query dialog box;
   if a positive input is received for the authorization query, determining the second application client has the permission of acquisition; and
   if a negative input is received for an authorization query, determining the second application client does not have the permission of acquisition.

6. The method of claim 1, wherein the encryption key comprises an encryption key that changes based on a preset change rule.

7. The method of claim 1, further comprising receiving identification information of the encrypted user data which is returned from the blockchain node after the blockchain node storing the encrypted user data in the blockchain database.

8. A method of user data authorization based on blockchain, said method being performed at a second application client and comprising:
   sending a request for acquiring user data to a first application client;
   obtaining authorization information based on a preset rule;
   obtaining encrypted user data corresponding to the user data from a blockchain database corresponding to a blockchain node based on the authorization information; and
   obtaining the user data based on the encrypted user data and the authorization information,
   wherein the encrypted user data of the user data comprises encrypted user data obtained by encrypting the user data by using an encryption key,
   wherein the authorization information is generated based on a decryption key corresponding to the encryption key and identification information of the encrypted user data,
   wherein the obtaining encrypted user data corresponding to the user data from a blockchain database corresponding to a blockchain node based on the authorization information comprises obtaining the encrypted user data based on the identification information of the encrypted user data in the identification information,
   wherein the obtaining the user data based on the encrypted user data and the authorization information comprises decrypting the encrypted user data using the decryption key in the authorization information to obtain the user data,
   wherein identification information of the second application client and the authorization information are stored in association with each other in the blockchain database,
   wherein the method further comprises sending the identification information of the second application client and a public key of the second application client to the blockchain nodes from a block corresponding to the blockchain node based on the identification information of the second application client,
   wherein the authorization information is generated by encrypting the decryption key and the identification information of the encrypted user data using the public key of the second application client, and
   wherein obtaining the encrypted user data corresponding to the user data from a blockchain database corresponding to a blockchain node based on the authorization information and obtaining the user data based on the encrypted user data and the authorization information comprises decrypting the authorization information using a private key of the second application client to obtain the decryption key and identification information of the encrypted user data.

9. The method of claim 8, wherein the encrypted user data of the user data comprises encrypted user data obtained by encrypting a hash value of the user data using the encryption key,
wherein obtaining the user data based on the encrypted user data and the authorization information comprises decrypting the encrypted user data using the decryption key in the authorization information to obtain a hash value of the user data and confirming a receipt of the user data by verifying the received user data using the hash value.

10. The method of claim 8,
wherein obtaining the authorization information based on a preset rule comprises obtaining the authorization information from a blockchain database corresponding to a blockchain node based on the identification information of the second application client.

11. The method of claim 8, further comprising sending the identification information of the second application client and the public key of the second application client to the blockchain nodes through a second application server, such that each of the blockchain nodes stores the public key of the second application client to a corresponding blockchain database based on the identification information of the second application client.

12. An apparatus of user data authorization based on blockchain, said apparatus being used with a first application client and comprising:
user data management module configured to send encrypted user data of user data to blockchain nodes, such that each of the blockchain nodes stores the encrypted user data in a corresponding blockchain database; and
an authorization module configured to generate authorization information in response to a request for acquiring the user data from a second application client, and notify the second application client to obtain the authorization information based on a preset rule, such that the second application client obtains the encrypted user data from a blockchain database corresponding to a blockchain node based on the authorization information and obtains the user data based on the encrypted user data and the authorization information,
wherein the encrypted user data of the user data comprises encrypted user data obtained by encrypting the user data using an encryption key,
wherein the authorization information is generated based on a decryption key corresponding to the encryption key and identification information of the encrypted user data,
wherein the second application client obtains the encrypted user data based on the identification information of the encrypted user data in the authorization information and obtains the user data by decrypting the encrypted user data using the decryption key in the authorization information,
wherein the identification information of the second application client and a public key of the second application client are stored in association with each other in the blockchain database,
wherein the identification information of the second application client and the public key of the second application client are obtained from a block corresponding to the blockchain node based on the identification information of the second application client,
wherein the authorization information is generated by encrypting the decryption key and the identification information of the encrypted user data using the public key of the second application client, and
wherein the second application client decrypts the authorization information using a private key of the second application client to obtain the decryption key and the identification information of the encrypted user data.

13. An apparatus of user data authorization based on blockchain, said apparatus being used with a second application client, and comprising:
a request module configured to send a request for acquiring user data to a first application client; and
an acquisition module configured to obtain authorization information based on a preset rule, obtain encrypted user data corresponding to the user data from a blockchain database corresponding to a blockchain node based on the authorization information, and obtain the user data based on the encrypted user data and the authorization information,
wherein the encrypted user data of the user data comprises encrypted user data obtained by encrypting the user data using an encryption key,
wherein the authorization information is generated based on a decryption key corresponding to the encryption key and identification information of the encrypted user data,
wherein the second application client obtains the encrypted user data based on the identification information of the encrypted user data in the authorization information and obtains the user data by decrypting the encrypted user data using the decryption key in the authorization information,
wherein the identification information of the second application client and a public key of the second application client are stored in association with each other in the blockchain database,
wherein the identification information of the second application client and the public key of the second application client are obtained from a block corresponding to the blockchain node based on the identification information of the second application client,
wherein the authorization information is generated by encrypting the decryption key and the identification information of the encrypted user data using the public key of the second application client, and
wherein the second application client decrypts the authorization information using a private key of the second application client to obtain the decryption key and the identification information of the encrypted user data.

14. A medium storing computer-executable instructions, when executed by a processor, the computer-executable instructions implement the method of user data authorization based on blockchain of claim 1.

15. A computing device comprising a memory, a processor, and executable instructions stored on the memory and executable by the processor, when executed by the processor, the executable instructions implement the method of user data authorization based on blockchain of claim 1.

16. A medium storing computer-executable instructions, when executed by a processor, the computer-executable instructions implement the method of user data authorization based on blockchain of claim 8.

17. A computing device comprising a memory, a processor, and executable instructions stored on the memory and executable by the processor, when executed by the processor, the executable instructions implement the method of user data authorization based on blockchain of claim 8.

* * * * *